June 2, 1970 A. LENDER 3,515,991

HIGH-SPEED CORRELATIVE DIGITAL TRANSMISSION SYSTEM
WITH ORTHOGONAL COHERENT RECOVERY
USING ABSOLUTE REFERENCE

Filed Oct. 31, 1966 6 Sheets-Sheet 1

INVENTOR
ADAM LENDER

BY

Lippincott, Ralls & Hendricson
ATTORNEYS

INVENTOR.
ADAM LENDER
BY
Lippincott, Ralls & Hendricson
ATTORNEYS

INVENTOR
ADAM LENDER
BY
Lippincott, Ralls & Hendricson
ATTORNEYS

INVENTOR
ADAM LENDER
BY
Lippincott, Ralls & Hendricson
ATTORNEYS

INVENTOR
ADAM LENDER
BY
Lippincott, Ralls & Hendricson
ATTORNEYS

INVENTOR.
ADAM LENDER
BY
Lippincott, Ralls & Hendricson
ATTORNEYS

United States Patent Office 3,515,991 Patented June 2, 1970

3,515,991

HIGH-SPEED CORRELATIVE DIGITAL TRANSMISSION SYSTEM WITH ORTHOGONAL COHERENT RECOVERY USING ABSOLUTE REFERENCE

Adam Lender, Palo Alto, Calif., assignor to Automatic Electric Laboratories, Inc., a corporation of Delaware Filed Oct. 31, 1966, Ser. No. 590,871
Int. Cl. H04l *27/00*
U.S. Cl. 325—38 13 Claims

ABSTRACT OF THE DISCLOSURE

Method and apparatus for signal transmission by encoding input binary signals to produce level coded signals having a correlation span over three bits and dividing the level coded signals into parallel channels out-of-phase with each other. The parallel channels are combined and an out-of-phase reference signal is added thereto for achieving time orthogonality for signals and frequency orthogonality for absolute reference. There is attained four times the speed capability of binary transmission in the same bandwidth.

The present invention relates in general to a three-level correlative process and system for the electronic transmission of data, providing the speed equivalent of four binary channels over a bandwidth which normally permits transmission of but a single binary channel. Reference is made to my copending patent application Ser. No. 338,445, filed in the U.S. Patent Office on Jan. 17, 1964, and now U.S. Pat. No. 3,337,863, for a general discussion of polybinary techniques.

In the field of data and voice transmission there has been developed a wide variety of processes and systems for improving the speed and quality of transmission and reception. The following description is primarily referenced to data transmission, and compared to binary-transmission techniques therein, although no limitation is intended thereby. In order to improve the speed capabilities of data transmission, there are sometimes employed multi-level signal systems which generally, however, are characterized by an absence of correlation between the code levels. There has, additionally, been developed a number of level-coded correlative signal systems; and, of these, one of the most promising is normally identified by the term "duobinary." The present invention is an improvement in the general field of duobinary systems, and reference is made to an article appearing in IEEE, "Transactions on Communications and Electronics," volume 82, May 1963, pages 214 to 218, for a general description of this type of system, and, more particularly, to U.S. Pat. No. 3,238,299 entitled "High-Speed Data Transmission System" by the present inventor. Numerous additional publications by the present inventor and others have set forth a variety of alternatives in the basic field of duobinary data transmission; and the present invention provides a major step forward in this general field. In this same respect, reference is made to copending patent application Ser. No. 528,484, filed Feb. 18, 1966, now U.S. Pat. No. 3,457,510 of July 22, 1969 by the present inventor and entitled "Modified Duobinary Data Transmission" for a description of method and apparatus for eliminating the D.C. component from the duobinary signal. While duobinary systems and processes provide for a signalling rate that is twice the straight binary rate, the present invention provides a signalling rate that is four times that available with straight binary methods.

The present invention employs time orthogonality for signals and frequency orthogonality for absolute reference relative to signals. The two signals above are in quadrature and occupy the same bandwidth. Their spectral density is such that there is a null at the carrier frequency. The correlative properties of the resultant transmitted and decoded signal hereof allow high-quality error detection without the introduction of redundant digits; and, in fact, the error-detection system disclosed and claimed in U.S. patent application Ser. No. 550,076, filed in the U.S. Patent Office on Apr. 20, 1966, now Pat. 3,461,246 of Aug. 12, 1969 for "Error Detection System for Modified Duobinary Systems" by the present inventor may be employed in connection with the present invention, as well as with the "Modified Duobinary Systems" noted above. The decoded signal hereof follows a predetermined set of rules as described below, although the coded signals hereof which are transmitted to a receiver appear to bear no resemblance to the original binary input or to the ultimate decoded signals.

The present invention has for its primary object the provision of a correlative digital transmission system of a duobinary type having an improved speed of transmission. More specifically, the present invention is directed to a system capable of transmitting information at twice the bit rate of either a duobinary or modified duobinary system. Another and important object of the present invention is the establishment of two orthogonal signals from a single input to thereby provide for a doubled transmission rate and the provision of an absolute reference for the recovery of information transmitted. It is also an object hereof to establish a carrier frequency in the encoding process rather than separately supplying a carrier; and it is noted that in this respect the present invention differs from duobinary and modified duobinary in that it does not employ the baseband technique.

The present invention is illustrated as to particular preferred embodiments thereof and steps in the process by the accompanying drawings wherein.

Figure 1:
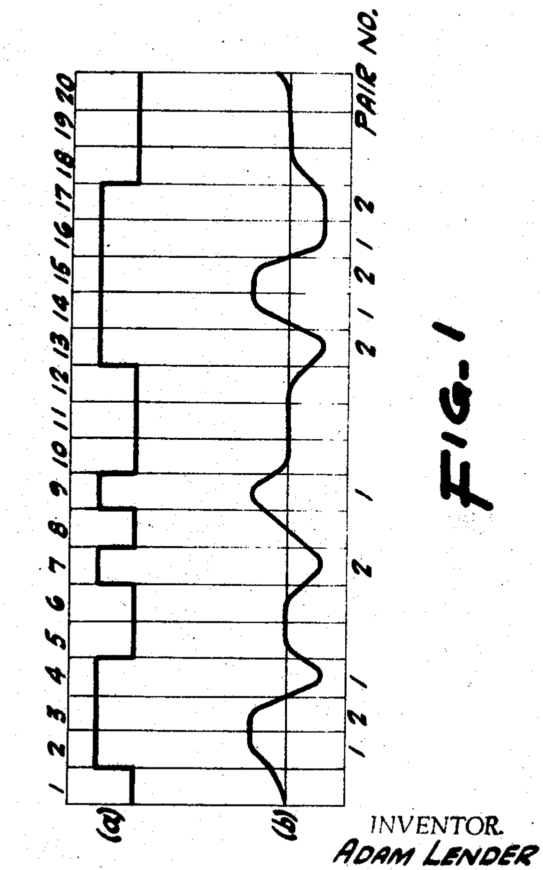
FIG. 1 is a diagram of wave-shapes illustrating the relationship of binary input to generated level-coded signals produced in accordance with the present invention.

Before proceeding with a description of the present invention, it is worthwhile to note that the method and apparatus hereof is applicable in the field of data transmission and digitalized speech systems. In the following description data transmission is employed as an example, and it is assumed that a binary input is utilized for operation upon by the present invention. In actuality, it is found that the resultant signal from the present invention (see FIG. 9, waveforms $x$ and $y$) is substantially the same as that which has previously been denominated as a "modified duobinary signal," in that the correlation properties of the resultant three-level signal are the same. Insofar as signal coding and handling are concerned, however, the present invention lies far afield from that of the modified duobinary system. In order to fully appreciate the significance of the correlation properties of the present invention, it is important to note that there is produced hereby a three-level signal in which the center level represents one binary condition, and the extreme levels, either plus or minus, represent the other binary condition. In addition to the foregoing, the resultant correlated signal hereof follows certain predetermined rules which thereby provide for ready retrieval of the information in binary form, and, also, provide for simplified and highly efficient error detection. The foregoing is best understood by reference to FIG. 1 illustrating an original binary signal, and the corresponding modified signal produced in accordance with the present invention. In FIG. 1 the time slots are numbered across the top, and at (*a*) there is illustrated a binary waveform. There is also illustrated in FIG. 1 at (*b*) a modified duobinary signal such as produced by the present invention in the particular manner described below wherein the extreme levels thereof represent or correspond to the upper level or MARK condition of the input binary waveform (*a*). The intermediate, or center, level of waveform (*b*) represents the lower level or SPACE condition of binary input (*a*). Insofar as the rules which are followed by the waveform (*b*), these may be best realized by grouping successive MARKS in pairs and assigning a pair number to each MARK, as illustrated in FIGURE 1. Successive MARKS are indicated by the numerals 1 and 2 with a repetition of this numbering for the next pair of MARKS. A MARK bearing No. 1 in a pair of two successive MARKS will be seen to always have the opposite polarity to the previous MARK which, of course, carries the No. 2. The polarity of the MARK identified by No. 2, relative to the previous MARK bearing No. 1, is governed by a set of odd and even rules. More specifically, if the number of intervening spaces between a pair of MARKS numbered 1 and 2 is even, then the polarities of these MARKS are the same. If the number of intervening spaces between a pair of MARKS numbered 1 and 2 is odd, then the polarities of these two MARKS are opposite.

The correlation properties of the waveform (*b*) produced in accordance with the present invention permit the ready detection of errors in received and transmitted data. In this respect it is noted that errors in received data may arise from a variety of circumstances due to transmission impairments such as noise which change a MARK to a space, or vice versa. Error detection involves a production of some type of indication such as a pulse at the receiver that an error has occurred, but does not identify the time location of such error. Conventional data transmission systems employ redundant binary digits inserted into their binary data stream at the input in order to provide for the detection of errors at the receiver. One of the important advantages of level-coded processes and systems is that redundant digits are not required. It will be realized that the insertion of additional digits in any binary pulse train reduces the amount of data that can be transmitted over any particular system.

The method of the present invention provides first for partial encoding an input binary data waveform. The invention hereof at the same time transforms the partially encoded serial waveforms into parallel waveforms which are disposed orthogonally in time and utilizes frequency orthogonality for absolute references relative to the signals. The two parallel signals are provided in quadrature and occupy the same bandwidth. Each of the data signals is in the form of synchronously phase-modulated modified duobinary waveform; and, thus, there is a null at the carrier frequency which accommodates the absolute reference.

The modified duobinary signals of this invention do not appear in baseband form when generated and, therefore, are not filtered, as described above, until further operations have been performed thereon. Also, reference is made to my copending patent application Ser. No. 528,484, filed Feb. 18, 1966, for a further disclosure of a particular modified duobinary method and apparatus.

Figure 2:
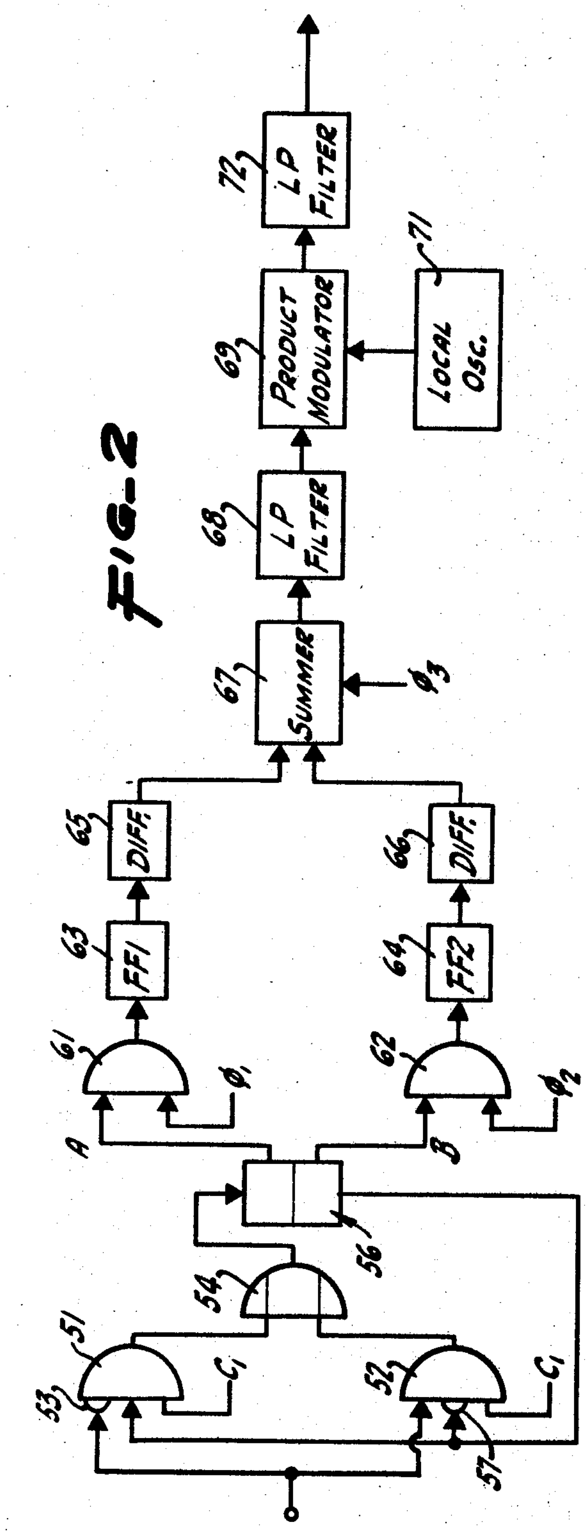
FIG. 2 is a block diagram of a first possible embodiment of the transmission system in accordance with this invention.
Figure 3:
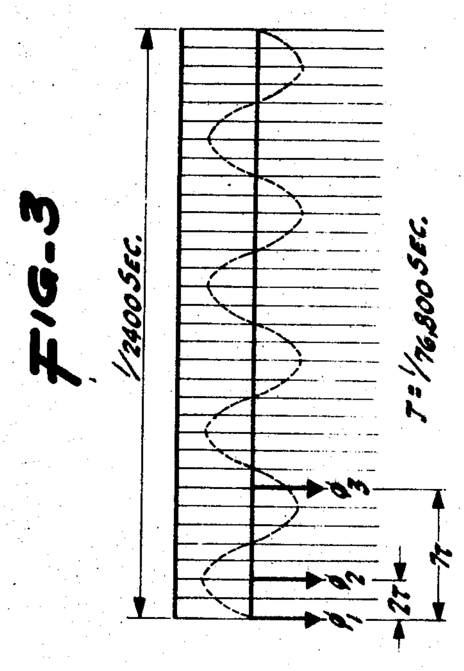
FIG. 3 is a time chart with superimposed wave cycles indicating time relationship of clock pulses employed herein.

Considering now one preferred transmission system, reference is made to FIG. 2 of the drawing wherein it is assumed that data input is at 4800 bits-per-second (hereinafter abbreviated as b.p.s.) for an ordinary voice channel, although any speed is possible depending upon the bandwidth of the channel. In accordance with the method as described above, the input data is subjected to a first encoding step and at the same time converted into two parallel streams at 2400 b.p.s. each. As illustrated, the input signal is applied to a pair of AND gates 51 and 52 with an inverter 53 reversing the sense of the signal applied to the gate 51. Also applied to these AND gates are clock pulses $C_1$, having a pulse rate of 4800 pulses per second. The output of the AND gates 51 and 52 are applied through an OR gate 54 to a two-stage shift register 56. The output of this shift register is applied back as inputs to the AND gates 51 and 52 with the input to the gate 52 being inverted, as indicated at 57. It is to be particularly noted at this point that a novel system of combining series-to-parallel conversion with encoding is employed herein. This results in the saving of N binaries (binary multivibrators) when N parallel bit streams are required. Although it is conventional to convert a serial pulse train to N parallel streams using an N-stage shift register, or N binaries, and then employ N encoders utilizing 2N binaries, the present invention performs the function of partial encoding and serial-to-parallel conversion simultaneously by introducing feedback, i.e., returning the output of the register back to the input of the gates 51 and 52. There is, thus, produced from the two-stage shift register 56 two parallel pulse streams at 2400 b.p.s., and the present invention provides for achieving orthogonality between these two streams. This is herein accomplished by the utilization of clock pulses indicated $\phi_1$ and $\phi_2$ in FIG. 2. The clock pulses $\phi_1$ and $\phi'$ read out the two-stage shift register and their repetition rate is 2400 pulses per second. In this particular embodiment, the bandwidth is selected to be centered at 9600 cycles per second, so as to provide four cycles per digit. This is based on the bit rate of 4800 b.p.s. with two parallel streams at 2400 digits per second each. Reference is now made to FIG. 3 indicating the time duration of one bit of the parallel streams A or B, i.e., $\frac{1}{2400}$ sec. which will be seen to be divided into thirty-two parts. Such a division may be provided by a master clock operating at 76,800 pulses per second and producing therefrom the $C_1$ clock pulses at 4800 pulses per second, as well as the other clock pulses employed in the system. The bandwidth is herein selected to be centered at 9600 cycles per second, providing four cycles per digit: four of such cycles are shown by the dashed line in FIG. 3. Clock pulse $\phi_1$ may be chosen at any interval such as, for example, zero in FIG. 3, and $\phi_2$ must then be placed at an odd multiple of a quarter cycle of 9600 cycles per second, so as to establish orthogonality between the two signals denominated in FIG. 2 as A and B. As illustrated in FIG. 3, $\phi_1$ and $\phi_2$ are separated only by one-quarter of the cycle, or $\frac{1}{38,400}$ second, although it is emphasized that $\phi_2$ may be placed at any odd multiple of a quarter cycle of 9600 cycles per second with respect to $\phi_1$ to assure orthogonality. In the second step of encoding, signal A from the shift register 56 is applied to a first gate 61, as is the clock pulse $\phi_1$, and the second signal B from the shift register is applied to a second gate 62, as is the second clock pulse $\phi_2$. The outputs of these gates 61 and 62 are applied to separate flip-flop circuits 63 and 64. In the third encoding step the outputs of the flip-flop circuits 63 and 64 are separately differentiated in circuits 65 and 66. These circuits may comprise RC differentiators, pairs of monostable multivibrators or other types of differentiators. The outputs of the differentiators are thus negative or positive spikes; and these are applied to a summing circuit 67 which also receives a third clock pulse $\phi_3$. This clock pulse $\phi_3$ must appear at an odd multiple of one-eighth of the cycle of 9600 cycles per second, and is illustrated in FIG. 3 as being applied in the last one-eighth of the carrier cycle. It will, thus, be seen that during each time interval of $\frac{1}{2400}$ sec. three time-multiplexed signals appear in the output of the summer. The output of the summer 67 is in the form of narrow pulses in which $\phi_1$ and $\phi_2$ may be positive, negative or absent while $\phi_3$ is always present and may be chosen either as a positive pulse or a negative pulse. In the present instance, it is chosen as a positive pulse. $\phi_3$ is actually a reference signal which in the frequency domain appears exactly at the selected carrier frequency which is the null point of the two information-carrying signals A and B.

The output of the summer 67 is passed through a lowpass filter 68 which, in this particular embodiment of the present invention, may have a cutoff at 11.1 kilocycles per second to preserve the 9600 cycles per second loop of the impulse signal and eliminate higher loops. In this context the term "loop" is taken to define the frequency spectra about the bit rate and harmonics thereof. The loop extends over plus and minus one-half the bit rate from the frequency numerically equal to the bit rate and multiples thereof, so that in this example the selected loop extends about 2400 c.p.s., or from 8400 c.p.s. to 10800 c.p.s.; and it is noted that at the input to the lowpass filter both orthogonal waves are made up of an infinite number of these spectral loops with each containing the basic information. This embodiment of the transmitting system employs a product modulator 69 wherein the output of the lowpass filter 68 is heterodyned with a signal 11.4 kilocycles from a local oscillator 71. The output of the product modulator 69 thus comprises a center frequency of 1800 cycles per second which is passed through a broadband lowpass filter 72 having a cutoff at 3.5 kilocycles, for example, and thence to some transmission medium such as, for example, a voice channel. It is noted that neither of the lowpass filters 68 or 72 are required to provide any particular wave-shaping and filter specifications are not stringent. The bandpass wave-shaping which provides final transmission of the orthogonal signal is accomplished at the receiving end, although it could be also done by replacing lowpass filter 72.

Figure 4:
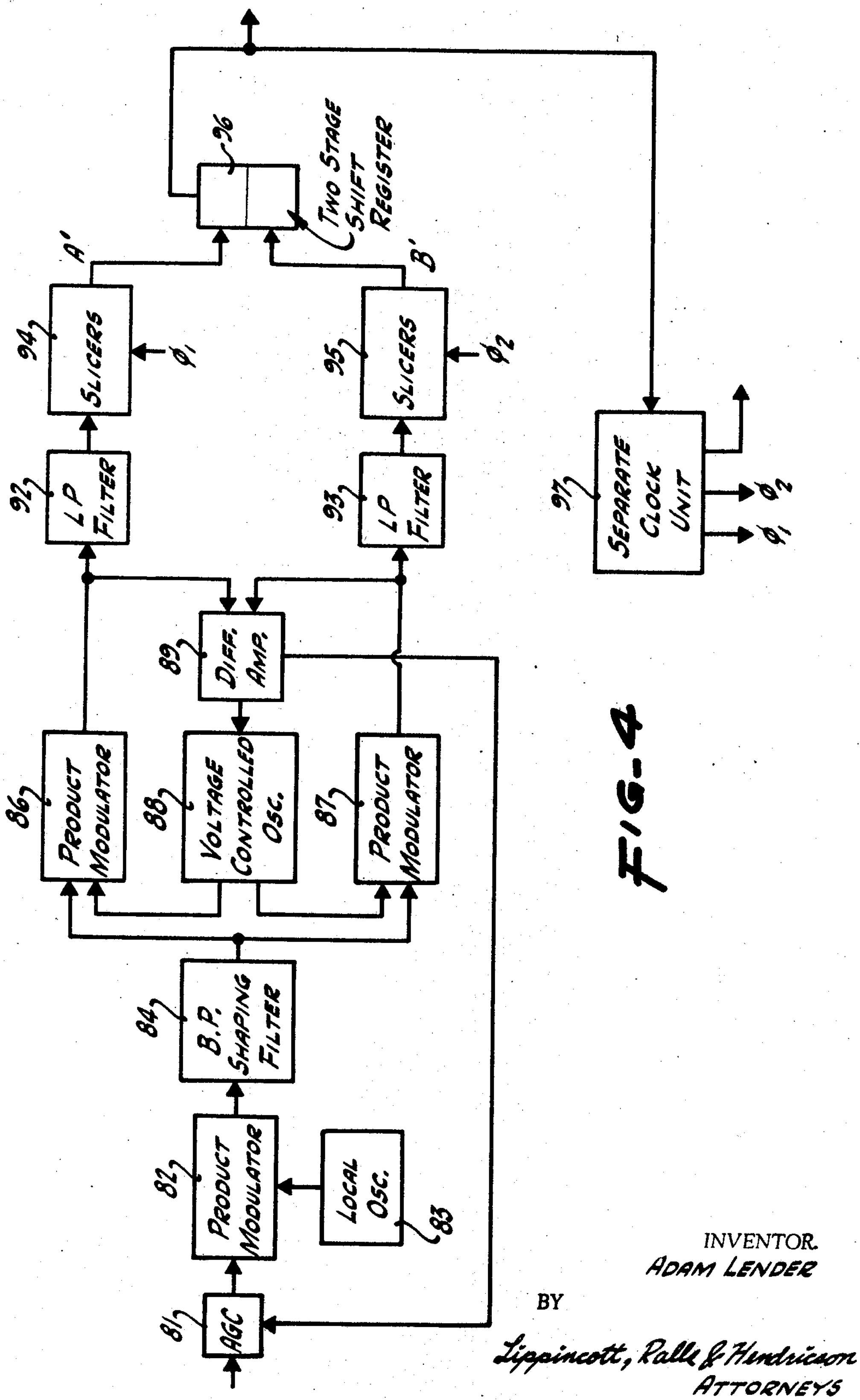
FIG. 4 is a block diagram of a receiver system adapted for utilization with the transmitter of FIG. 2.

It is to be appreciated that a wide variety of transmission mediums may be employed, such as, for example, physical systems such as cables, carrier systems like telephone voice channels or the like. At the opposite end of the transmission medium there is provided a receiver system such as illustrated in FIG. 4. Referring now to FIG. 4, it will be seen that following an automatic gain control circuit 81, the received signal is applied to a product modulator 82 which also receives the input from a local oscillator operating, in this instance, at the same 11.4 kilocycles to translate the signal spectrum back to the center frequency of 9600 cycles per second. The output of the product modulator is then applied to a bandpass filter 84 centered at 9600 cycles per second to provide strict band limitation and shaping. The filter 84 has nominally a zero transmission at 8400 c.p.s. frequency and zero transmission at 10800 c.p.s. Maximum transmission occurs at $f_1$(9600 c.p.s.), and typical characteristics are usually a practical network approximation of half cycle sine wave centered in this case at 9600 c.p.s. and extending over 2400 c.p.s. This band limitation could be equally well employed at the transmitter of FIG. 2 by replacing lowpass filter 72. It is to be appreciated that the input signal to the receiver actually comprises two orthogonal signals in the same bandwidth; thus, the output of the bandpass-shaping filter 84 is correlated in two product modulators 86 and 87 using coherent detection with absolute reference with inphase and quadrature references provided by a voltage-controlled oscillator 88 that is driven by a differential amplifier 89 receiving, as inputs, the outputs of the product modulators 86 and 87. It will be appreciated that the differential amplifier 89 is driven by the differential of the two orthogonal signals from the product modulators still unfiltered, so as to produce D.C. outputs effectively proportional to the error voltage for frequency and phase stabilization of the voltage-controlled oscillator. The output of the voltage-controlled oscillator 88 provides the carrier reference frequency extracted from the line signal; this reference carrier frequency is provided in the proper phase to the product modulator 86 and in quadrature to the product modulator 87. A pair of lowpass filters 92 and 93 also receive the unfiltered outputs of the product modulators 86 and 87, respectively, for smoothing of the two orthogonal signals, and the filter outputs representing the line signals are applied to two separate sets of slicers 94 and 95. Each set of slicers consists of two slicers for a three-level signal. The outputs of the slicers are gated with clock pulses $\phi_1$ and $\phi_2$ into the two-stage register as indicated, and such clock pulses correspond to the like pulses in the transmitter at the rate of 2400 pulses per second. The slicers and clock pulses convert the three-level signal into conventional binary data at points A′ and B′, as indicated in FIG. 4; and such data is then converted from parallel to serial form and read out from register 96 at 4800 b.p.s. The clock pulses $\phi_1$ and $\phi_2$ may be derived from the data transitions in the data signals by a separate clock unit 97 connected with the output of the shift register 96, and providing the delay of $\frac{1}{38,400}$ sec. in $\phi_2$ with respect to $\phi_1$ which, of course, both have a repetition rate of 2400 pulses per second. This delay is the same as at the transmitter of FIG. 3, and is equal to one-quarter of the carrier cycle at frequency of 9600 Hz. for the case shown.

Figures 5, 6:
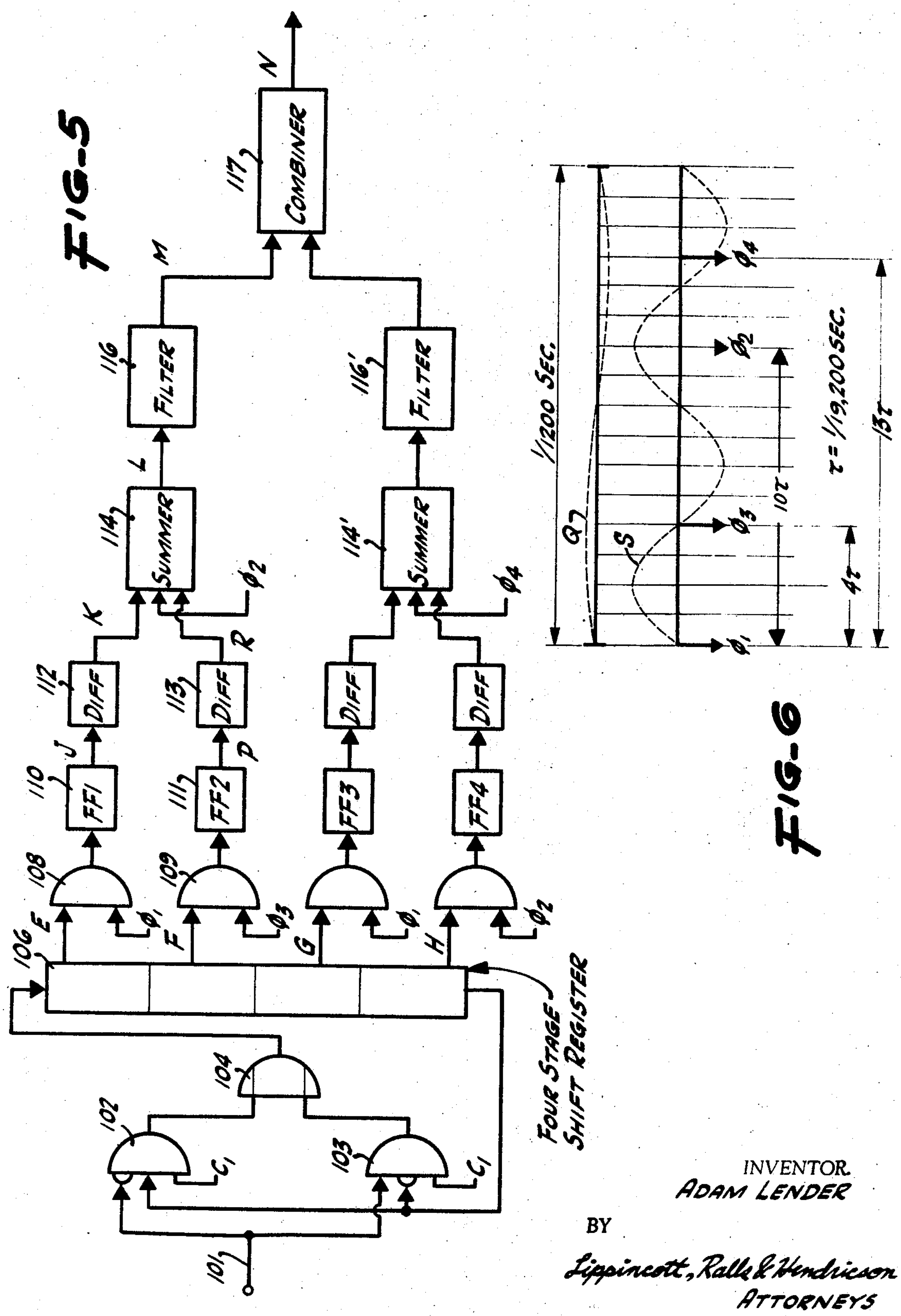
FIG. 5 is a second possible embodiment of the transmission system in accordance with the present invention.
FIG. 6 is a time chart of clock pulses employed in the embodiment of the invention illustrated in FIG. 5.
Figure 7:
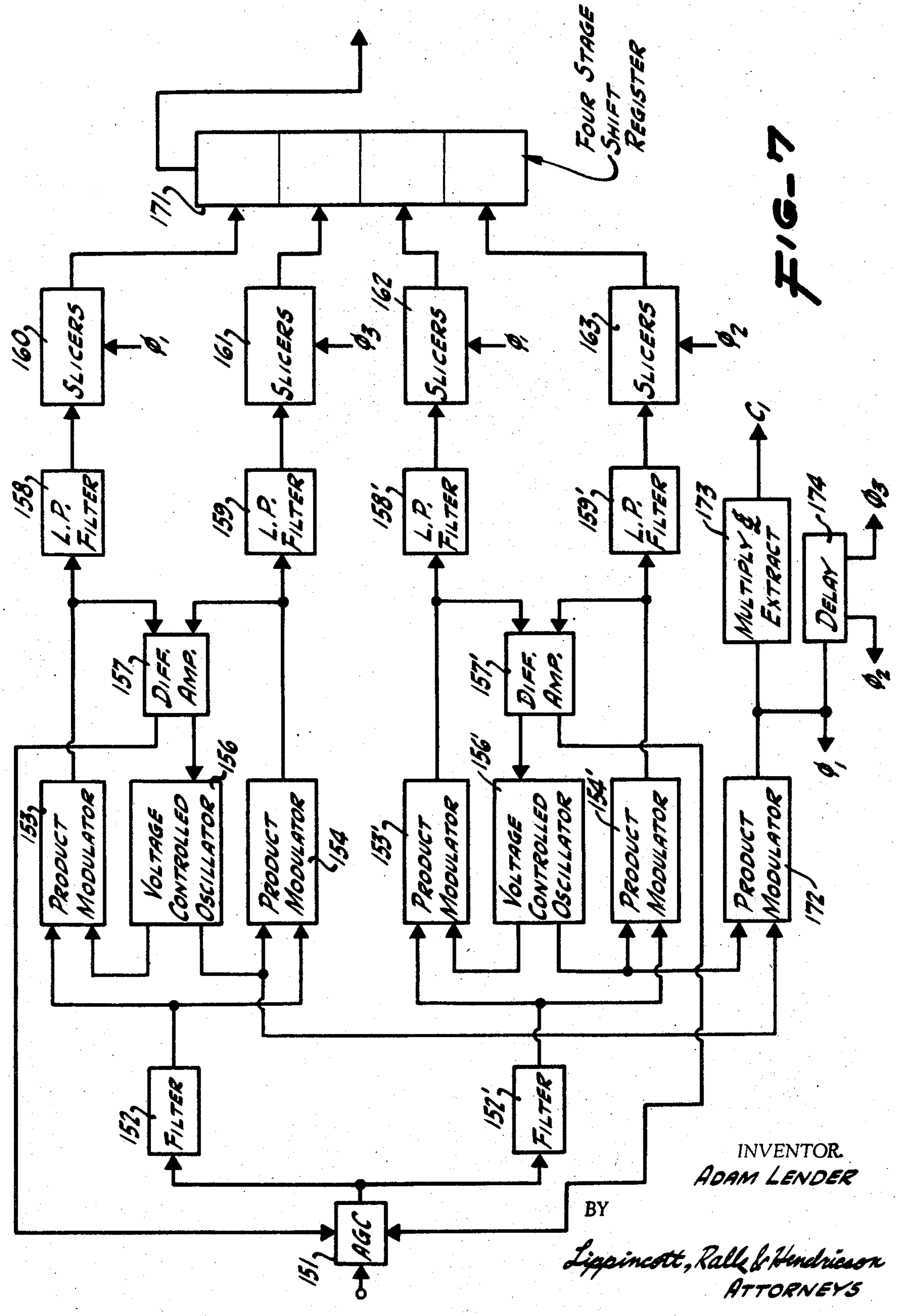
FIG. 7 is a block diagram of a receiver for utilization with the transmitter of FIG. 5.

An alternative embodiment of the present invention is illustrated in FIGS. 5 to 7 wherein it is also assumed also for a voice channel as an example, that the input data arrives at 4800 b.p.s. Referring to FIGS. 5 and 6, it is first noted that heterodyning of the signal is not employed herein, but instead one signal comprising a first pair of channels has one carrier cycle per digit, and the other signal comprising a second pair of channels has two carrier cycles per digit with the digit rate being 1200 digits per second. It may be considered that this system operates to simultaneously establish four binary channels in two frequency multiplexed adjacent bandwidths; however, the overall bandwidth is exactly the same as in the system described above as well as the overall speed which is 4800 b.p.s. In the system of FIG. 5 encoding is accomplished with a four-stage shift register employing feedback as previously described, so as to eliminate the requirement of separate serial-to-parallel conversion from 4800 b.p.s. to four parallel streams of 1200 b.p.s. each. More specifically, the system of FIG. 5 includes a data input terminal 101 receiving data at the rate of 4800 b.p.s. and this input terminal is connected to a pair of AND gate circuits 102 and 103 while being inverted in application to gate 102. Each of these gates, 102 and 103, receives clock pulses $C_1$ at 4800 pulses per second, and the AND gate outputs thereof are applied to an additional OR gate 104 which feeds a four-stage shift register 106. The output of this shift register is applied back to the inputs of the gates 102 and 103 while being inverted in application to the gate 103. This portion of the circuitry may be considered as a first stage of encoding combined with serial-to-parallel conversion, and the second stage and encoding employs three of the four clock pulses $\phi_1$ to $\phi_4$, FIG. 5; however, a different relationship is required between these clock pulses than that employed in the embodiment of FIG. 2. While first clock pulse $\phi_1$ may be considered to start at zero time, and, for example, zero phase of each of the two carriers, as illustrated in FIG. 6, the additional clock pulses $\phi_2$ and $\phi_3$ must be in quadrature with respect to $\phi_1$ at the two different carrier frequencies respectively. As shown in FIG. 6, the bit time interval equal to $1/1200$ sec. is divided into sixteen portions wherein each time interval therein is equal to $1/19,200$ sec. and superimposed upon this figure are the two carrier frequencies, the first being indicated by the dotted line Q and the second by the dotted line S. The important point is that there is provided an integral number of carrier cycles per bit and the numbers herein are only exemplary. Clock pulse $\phi_3$ is illustrated to be in quadrature with pulse $\phi_1$ in regard to the carrier Q having one cycle per digit, and the clock pulse $\phi_2$ is in quadrature with respect to the clock pulse $\phi_1$ with reference to a carrier having two cycles per digit. In the following description it is only necessary to consider one of the pairs of orthogonal signals on one carrier, inasmuch as the other pair is operated upon the same manner on the second carrier. Thus, considering the signals E and F from the first two stages of the four-stage shift register 106, it will be seen that they are separately applied to gates 108 and 109, along with clock pulses $\phi_1$ and $\phi_3$, respectively, which is the second encoding stage. The outputs of these gates are then applied in complementary manner to flip-flop circuits 110 and 111. In the third encoding stage the signals are therefrom differentiated in circuits 112 and 113 to produce positive and negative spikes, or impulses. These differentiated signals are combined together with the clock pulse $\phi_2$ which at this point serves as a reference signal for the upper pair of channels in FIG. 5 in a summer 114, and the output thereof is passed through a standard bandpass filter 116, having a center frequency of 1200 cycles per second, to produce an analog signal therefrom carrying a total of 2400 b.p.s. Clock pulse $\phi_2$ can be located at any odd multiple of a forty-five degree angle of this carrier in relation to clock pulse $\phi_1$.

The other two channels of the system of FIG. 5 carry 2400 b.p.s., and operate in a similar manner with clock pulses $\phi_1$ and $\phi_2$ being applied to the signals G and H from the third and fourth stages of the shift register 104, and the clock pulse $\phi_4$ which serves as the reference signal for this particular pair of channels, being combined at the summer 114'. This clock pulse $\phi_4$ can be located at any odd multiple of a forty-five degree angle of the second carrier in relation to the clock pulse $\phi_1$; and, as illustrated in FIG. 6, it may be positioned at the thirteenth time interval following the initial clock pulse $\phi_1$, merely to prevent crowding of the clock pulses. The output of the summer 114' is applied to a standard bandpass filter 116', having a center frequency of 2400 cycles per second, and the output of the two filters 116 and 116' are both applied to a combiner 117 which then feed some type of conventional transmission medium for eventual receipt at a receiver, such as the one illustrated in FIG. 7.

The receiver of FIG. 7 closely resembles the receiver described above in connection with FIG. 4; however, it does not include a heterodyning stage. Following an automatic gain control circuit 151 receiving the transmitted signal, such signal is applied to two filters 152 and 152' matched to the transmitter filters 116 and 116' to complement same, so that the overall signal fits into the standard available voice bandwidth of 600 to 3000 cycles per second. Considering only the upper portion of the receiver of FIG. 7, it will be seen that the output of the filter 152 is applied as inputs to product modulators 153 and 154 which also receive inputs from a voltage-controlled oscillator 156 that is, in turn, driven from the outputs of these product modulators through a differential amplifier 157. The output of this differential amplifier is also applied as an input to the automatic gain control circuit 151, as is the output of the other differential amplifier 157' in the lower portion of the receiver. Lowpass filters 158 and 159 pass the outputs of the product modulators 153 and 154 respectively to slicers 160 and 161. Also applied to these slicers 160 and 161 are clock pulses $\phi_1$ and $\phi_3$ respectively.

The output of the slicers 160 and 161 of the upper channels are applied to a four-stage shift register 171, and, likewise the outputs of slicers 162 and 163 are applied to this same four-stage shift register. It is particularly noted that the slicers 162 and 163 in the lower channels receive the clock pulses $\phi_1$ and $\phi_2$ respectively. The output of the four-stage shift register constitutes a substantial reproduction of the original binary data fed into the transmitter at 4800 b.p.s. in serial form. It is possible in this embodiment of the present invention to generate the clock pulses required in the receiver directly from the transmitted waveforms, such as illustrated at the bottom of FIG. 7 wherein a product modulator 172 is shown to receive inputs from both voltage-controlled oscillators, that is steady reference frequencies 1200 c.p.s. and 2400 c.p.s. (for this particular example) to produce a difference output comprising clock pulses $\phi_1$ at 1200 pulses per second, that is, in turn, applied to a multiply-and-extract circuit 173 to produce the requisite output clock pulse $C_1$ at 4800 pulses per second for reading out in serial form the output of the shift register 171 in FIG. 7. Subsequent clock pulses may be generated from the initial clock pulse $\phi_1$ by an appropriate delay line, or circuitry, 174, as indicated. Here it is to be noted that the two receiver filters 152 and 152' complement the transmitter filters 116 and 116', so that the overall signal properly fits into the standard bandwidth taken in this case to be from 600 to 3000 cycles per second.

Figure 8:
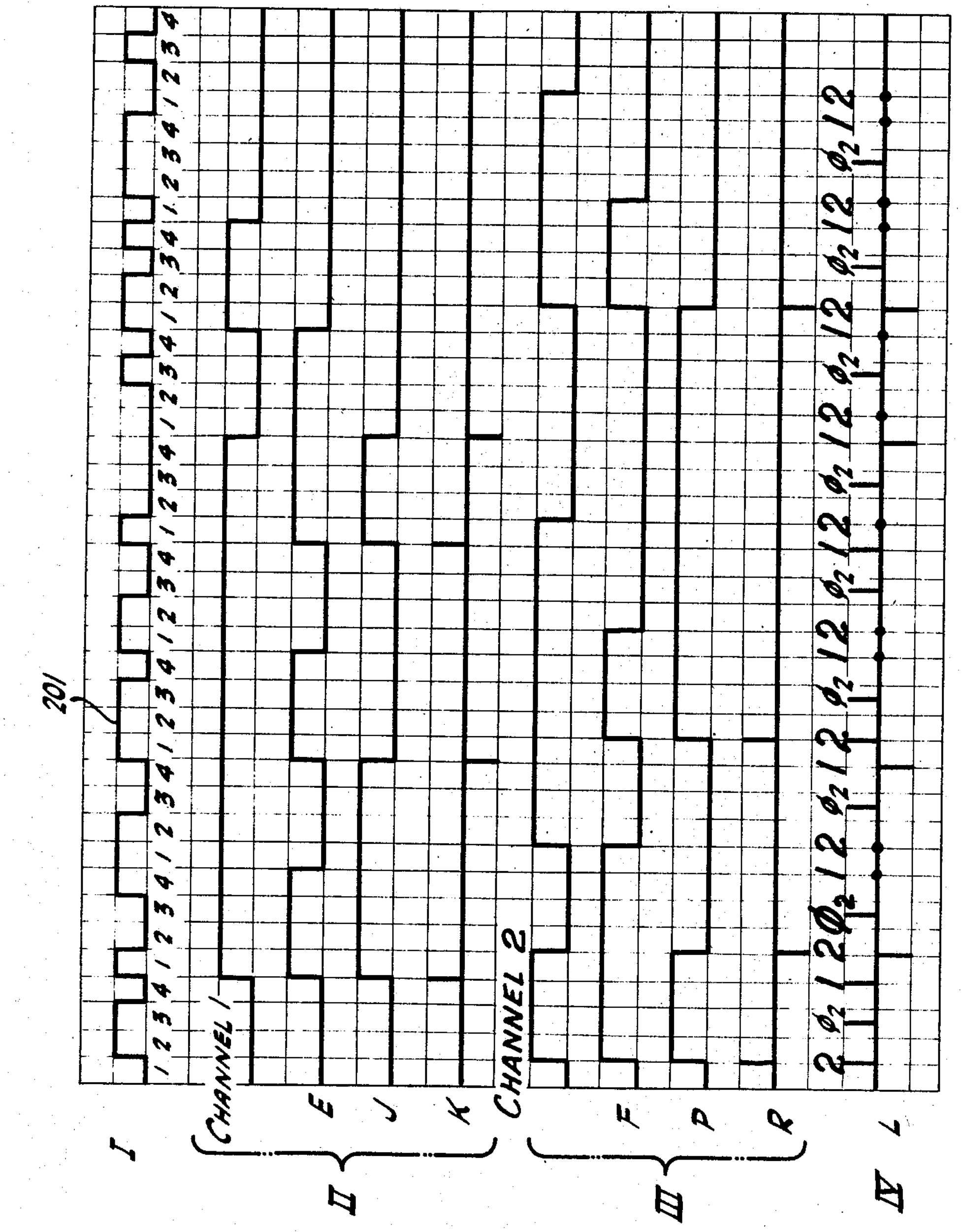
FIG. 8 illustrates at I, II, III and IV certain waveforms at identified portions of the transmitter of FIG. 5.

As an assistance in understanding the present invention, there are illustrated in FIG. 8 certain waveforms including an input binary data waveform and waveforms at certain identified portions of the embodiment of the present invention illustrated in FIG. 5. It is to be particularly noted that the waveforms of this figure are simplified, particularly to the extent of amplitudes, in order to emphasize the particular time characteristics of importance in this invention. Referring now to FIG. 8, there is shown at I a typical binary pulse train 201 which, in accordance with the foregoing example, may be considered to provide data at 4800 b.p.s. As described above, the input data at the assumed rate of 4800 b.p.s. is converted in the first stage of the coding process into four channels, indicated by the consecutive numbering from 1 to 4 at I of FIG. 8. It is believed apparent that the channels 1 and 2 are, in fact, repeated in channels 3 and 4, so that the following discussion and illustrations of FIG. 8 are referenced only to channels 1 and 2. All of these considerations apply equally well to channels 3 and 4, as well as to the embodiment of the present invention illustrated in FIG. 2. With the division of the serial input into four channels, it will, thus, be seen that each four channels has a speed of 1200 b.p.s and that each of the digits therein corresponds to the time slots in the original data designated by the number 1 of the input data waveform 201. The portion II of FIG. 8 depicts waveforms in channel 1 of the embodiment of FIG. 5, and consequently has a different time base, equal in this instance to 1200 b.p.s. The first waveform in FIG. 8, II, is thus a representation of the first portion of the input data 201, which forms channel 1; and in order to more clearly bring out the overall pattern of the waveform, the latter has been represented as a continuous trace, that is, as if each of its bits which actually appear only in time position 1 of each cycle in interleaved relationship with the bits of the other channels, persisted throughout the remainder of each cycle. This applies correspondingly to the representation of channel 2 mentioned below. The first stage of encoding, i.e., the gates 102, 103 and 104 and register 106 produce the waveform E wherein there is correlation between successive digits thereof. In this connection it may be noted that the overall configuration of gates 102, 103 and 104 represents an Exclusive-OR gate; and that, as is well-known in the art, the last-mentioned type of gate has the property that if a pulse appears at either of its two input leads an output results, but that no output results if pulses appear simultaneously at both inputs or if no pulses appear at either input. The second stage of encoding produces the waveform J wherein each digit is correlated with the second previous digit, rather than the immediate previous digit. Following differentiation there are produced positive and negative pulses, as indicated at K, which will be seen to bear no apparent relationship to the original data of channel 1. Proceeding further with the illustrations of FIG. 8, it is noted that insofar as channel 2 is concerned, the first waveform, identified as channel 2, 1200 b.p.s., corresponds to the time slots in the original data designated channel No. 2, and the waveforms F, P and R represent the first stage of encoding, the second stage of encoding and the results of the differentiation, as in channel 1. The waveforms K and R are then added together, as in the summer 114 of FIG. 5, together with the clock pulse $\phi_2$ which, as will be recalled, is used here as a reference signal. Waveform L will thus be seen to represent the final outcome of the digital-signal generation, and, following same, there is provided standard bandpass filtering in the same manner as in conventional duobinary systems previously defined. It is noted that insofar as waveform L is concerned, the pulse, or impulse, $\phi_2$ which during each cycle appears between the time slots of channel 2 and channel 1 is actually much smaller than pulses 1 and 2; however, no attempt is made in this illustration to accurately depict signal power. The transformation from waveform L is linear; thus, the output waveform actually comprises three components which are the sum of three separate filter responses to waveforms K, R and clock pulses $\phi_2$ in FIG. 8. This waveform ultimately appears in the transmission medium and results in nine distinguishable signal states at regular intervals which, in the present instance, are $1/1200$ sec.

Figure 9:
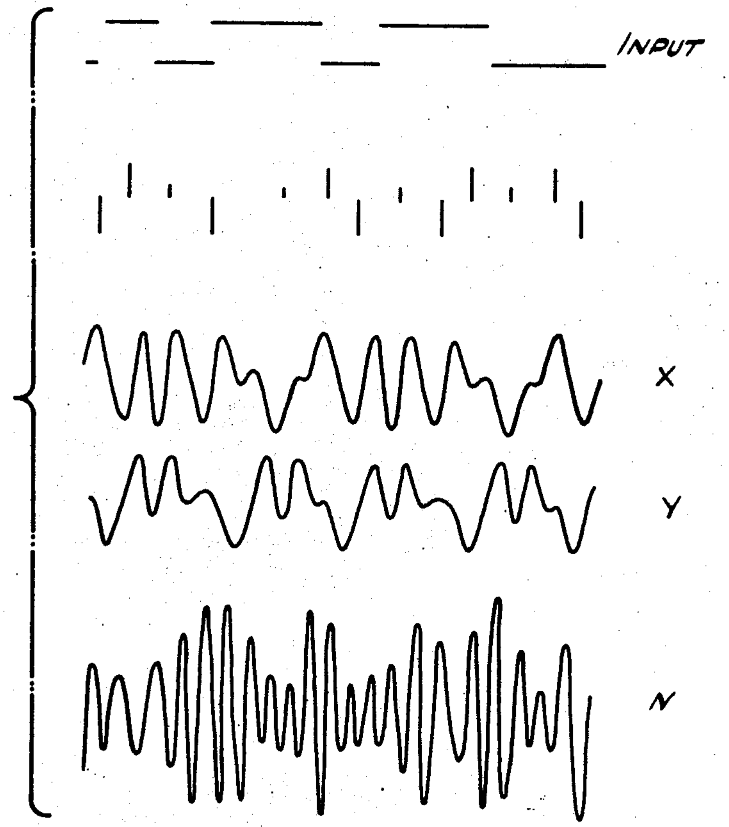
FIG. 9 is a representation of actual waveforms as shown by an oscilloscope.

Further with regard to actual waveforms employed and generated by the present invention, reference is made to FIG. 9 which is a general reproduction of actual oscilloscope photographs. The binary input signal is illustrated in FIG. 9 by the legend "input." In FIG. 9 there is also illustrated the corresponding encoded binary data and reference immediately beneath the input. At N of FIG. 9 there is represented the actual line signal produced from the combination of the encoded signals of channels 1 to 4. Finally, waveforms X and Y, FIG. 9, represent the outputs of the low pass filters, such as 158 and 159, FIG. 7. These outputs are the three-level modified duobinary waveforms with the extreme levels being MARKS and the center level being SPACE; there is, of course, one to one correspondence with the original binary data at the sampling instants.

Further considerations important in a full understanding of the present invention include the determination of spectral density. In general there follows a derivation of the spectral density.

The present signal sequence $x_n$ is obtained from the original binary sequence $a_n$ in such a manner that a zero remains a zero. Binary 1 of $a_n$ becomes $+1/2$ or $-1/2$ in $x_n$; the sign of $x_n$ depending upon $x_n$ being first or second of a pair in accordance with the previously stated rules. For simplicity it may be assumed that $p(1)=p(0)=1/2$ in $a_n$ and therefore in $x_n$, $p(+1/2)=p(-1/2)=1/4$ and $p(0)=1/2$. The first and second moments of $x_n$ are 0 and $1/8$ respectively. The continuous component of spectral density may be written as:

$$W(f)=\frac{1}{T}\left|G(f)\right|^2\sum_{-\infty}^{\infty}[R(k)-m^2]e^{jk\pi fT} \qquad (1)$$

where T is the duration of digits in second and $R(k)$ is the autocovariance function. In consideration of all possible patterns for all values of $k$, it is clear that the ones beginning or ending with zero do not contribute to $R(k)$. Furthermore, all patterns for a particular $k$ have the same probability. Considering the initial digit may be either first or second in the pair of MARKS, $R(0)$ is the second moment or $1/8$, $R(1)=0$, and $R(2)=-1/8$. It may then be determined as follows that for $k=>2$, all $R(k)=0$.

Proceeding with the foregoing derivation, $R(k+1)$ is obtained from $R(k)$ by first adding a binary "0" to the second position of each contributing pattern of $a_n$. The contributing word pattern is defined as one that starts and ends with binary 1. The remaining patterns are obtained by adding a binary "1" also to the second position. The number of products $x_n x_{n+k}$ in $R(k)$ with a positive sign is the same as the number of products with a negative sign for $k>2$ so that $\overline{x_n x_{n+k}}$ is zero. This is true regardless of whether the initial digit of a pair is number one or two, and can be easily verified for $k=3$ with eight such products or $k=4$ with sixteen products. Out of sixteen, half start with the first "1" of a pair and the other half with the second "1" of a pair. Next, $R(k+1)$ is formed, say for $k=1=5$, using contributing patterns of $a_n$. It turns out that when binary "0" is added and the initial digit is first of a pair, the product signs $x_n x_{n+k+1}$ are exactly opposite of the product signs $x_n x_{n+k}$ also with the same initial digit. If the initial digit is second of the pair in both cases, then the product signs $x_n x_{n+k+1}$ and $x_n x_{n+k}$ are identical. When binary "1" is added to form $R(k+1)$ from $R(k)$, the product signs $x_n x_{n+k+1}$ with initial digit number one of a pair are the same as product signs $x_n x_{n+k}$ with initial digit number two of a pair. Finally, the product signs $x_n x_{n+k+1}$ with initial digit number two are reversed compared to those of $x_n x_{n+k}$ with initial digit number one (for binary "1" added in the second position). Considering all the four possible cases in forming $R(k+1)$ from $R(k)$ and $x_n x_{n+k}$ for $k>2$, it is easily deduced that if $x_n x_{n+k}$ is zero, then $x_n x_{n+k+1}$ is zero for $k>2$. Next we apply these results to expression (1) and the spectral density of the modified duobinary is:

$$W(f)+\frac{1}{4T}|G(f)|^2\sin^2 2\pi fT \qquad (2)$$

Equivalently:

$$\sin^2 2\pi fT=|1-e^{-j4\pi fT}|^2 \qquad (3)$$

Expression (3) indicates binary-to-modified duobinary transformation in adding to encoding. But $2\pi f=\omega$, and:

$$1-e^{-j2\omega T}=(1-e^{-j\omega T})(1+e^{-j\omega T}) \qquad (4)$$

or using the first two terms of the series approximation for the first part:

$$1-e^{-j2\omega T}=j\omega T(1+e^{-j\omega T}) \qquad (5)$$

Now $j\omega$T implies differentiation of the encoded binary signal and this is precisely what is done in the experimental system, namely RC differentiation (see FIGS. 3 and 5). This is followed by the passive filter the same as duobinary, representing the term $(1+e^{-j\omega T})$ plus whatever shaping is necessary.

Figure 10:
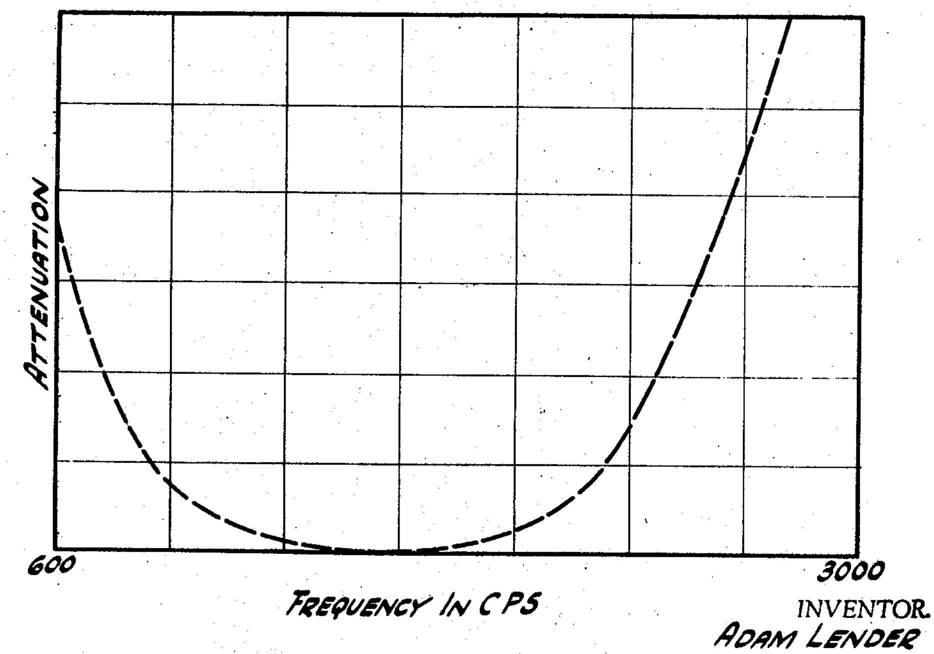
FIG. 10 is a graph of filter characteristics.

Although it is believed that the general theory of modified duobinary data transmission is adequately known, as by reference to the I.E.E.E. Spectrum article of February 1966 and patent application, there is also included herein FIG. 10 illustrating the characteristic of the bandpass filters employed in the present invention in this particular example for 4800 b.p.s. By virtue of the signal characteristic which has a null at the carrier frequency of 1800 c.p.s., the present invention provides for the generation of a reference carrier frequency which does not interfere with the signal. It is to be particularly noted, however, that the present invention operates to produce separate modified duobinary signals in quadrature occupying the same bandwidth, so that there is a null at the actual carrier frequency which accommodates the absolute reference relative to the signals. It is realized that the concept of the present invention is not particularly obvious without a full and complete comprehension of modified duobinary signals; and thus it is emphasized that reference thereof is exceedingly helpful in the full understanding of this invention. In addition to the advantages of orthogonal coherent modified duobinary data transmission in general, the present invention does provide for a quadrupling of the possible rate of binary data transmission over any particular transmission medium of predetermined bandwidth. For example, the bandpass filter in FIG. 10 accommodates 1200 b.p.s. binary, 2400 b.p.s. duobinary and 4800 b.p.s. orthogonal coherent modified duobinary.

It will be appreciated from the foregoing description that the present invention does accomplish the objects set forth above the consequently provide a material advancement in the art. It is not intended to limit the present invention to the details of the foregoing examples or accompanying illustrations, but instead reference is made to the following claims for a precise delineation of the true scope of the present invention.

What is claimed is:

1. An improved method of generating a transmission signal from an input having a predetermined bit rate comprising the steps of:

(a) simultaneously coding the input to provide correlation between successive bits and converting the input into four channels so that the signals in each said channel have one quarter the bit rate of the input and correspond separately to every fourth bit of the input in coded form;

(b) further coding the signals in each of said four channels to establish correspondence between each bit with the second preceding bit therein;

(c) differentiating said further coded signals of each channel to produce impulses;

(d) adding together the impulses of the first and second of said four channels;

(e) adding together the impulses of the third and fourth of said four channels;

(f) combining the signals resulting from the summation of the first two channels with clock pulses of the same frequency as each channel bit rate but out-of-phase with the two channel signals;

(g) combining the signals resulting from the summation of the other two channels with clock pulses of the same frequency as each channel bit rate but out-of-phase with the other two channel signals;

(h) separately bandpass filtering the signal trains resulting from steps (f) and (g); and (i) combining the signal trains of step (h) to produce a transmission signal.

2. An improved method of generating from binary input data having a relatively high bit rate, a signal for transmission over a limited bandwidth, comprising the steps of:

(a) translating said input data into two pairs of encoded waveforms, with each waveform having one quarter the bit rate of said input data and each representing a different quarter cycle of the input data, and with the two waveforms of each pair being in phase quadrature at the carrier frequency of the respective pair;

(b) separately differentiating each of the encoded waveforms;

(c) combining the two differentiated waveforms of each pair to produce two three-level correlated waveforms, one for each said pair, and adding to each of the two three-level waveforms a clock pulse that is out-of-phase with the two three-level waveforms;

(d) separately filtering said three-level waveforms, thereby establishing said carrier frequency; and (e) combining the two filtered signals of step (d) to produce said transmission signal.

3. A method of generating from binary input data a signal for transmission over a limited bandwidth, said input data having four times the bit rate possible with direct transmission of said data over said bandwidth, comprising the steps of:

(a) translating said input data into waveforms that are ninety degrees out-of-phase, have one-half the input bit rate each so as to separately represent different alternate bits of said input data, and are coded so that in each said waveform each bit is correlated to the second preceding bit;

(b) separately differentiating the waveforms of step (a);

(c) combining the differentiated waveforms to produce a three-level correlated waveform, and adding a clock pulse that is out-of-phase with each of the waveforms;

(d) filtering the output of step (c);

(e) heterodyning the output of step (d) with a predetermined frequency; and (f) bandpass filtering the output of step (e) to produce said transmission signal, said signal containing the binary input data in recoverable form.

4. A method of transmitting input signals, having a predetermined bit rate, with bandwidth compression, comprising the steps of:

(a) series-to-parallel converting said input signals and encoding said signals, such that *n* channels of level-coded signals are formed, the signals in each said channel representing every nth bit of the input signals and said channels being out-of-phase with each other at the corresponding carrier frequency;

(b) combining pairs of said channels to form a signal train conducting the encoded input in multiple out-of-phase signals;

(c) adding a reference signal in out-of-phase relation to the signals of each signal train of (b);

(d) filtering the result of step (c) to establish said carrier frequency and form a generated signal;

(e) transmitting the generated signal of (d) and receiving same;

(f) decoding the separately phased signals at the receiver; and (g) recombining the decoded signals to form a single train of pulses same as said input signals.

5. The method of claim 4 further characterized in that step (a) includes series-to-parallel converting and, simultaneously therewith, partially encoding said input signals, and subsequently completing said encoding, such said that *n* channels of lever-coded signals are formed, the signals in each said channel representing every *n*th bit of the input signals, where *n* is chosen from the numbers 2 and 4, and the channels of each of said pairs being in phase quadrature with each other at the corresponding carrier frequency.

6. The method of claim 5 further characterized in that the channels of each of said pairs are placed in relative phase quadrature by means of correspondingly timed clock pulses; and that said reference signal is formed by addition to the corresponding signal train of a reference pulse which is out-of-phase with said signal train at said carrier frequency.

7. The method of claim 4 further characterized in that step (a) comprises series-to-parallel converting and encoding said input signals so that *n* waveforms are formed, in each of which every bit is correlated with the second preceding bit therein; and then differentiating each of said waveforms so as to form said *n* channels of level-coded signals.

8. The method of claim 7 further characterized in that $n=2$; that prior to the formation of said generated signal the result of the filtering of step (d) is heterodyned with a signal of predetermined frequency; and that the heterodyned signal is filtered to produce said generated signal for transmission.

9. The method of claim 8 further characterized by bandpass filtering the generated signal prior to decoding thereof.

10. An orthogonal duobinary transmission system comprising:

(a) a first stage coder adapted to receive binary input data at a predetermined bit rate and converting the input by series-to-parallel conversion into a number of pairs of channels of a bit rate equal to said predetermined bit rate divided by twice said number, the two channels of each pair being mutually orthogonal at the carrier frequency of said pair;

(b) a second stage coder incorporating gating pulses with the signals of each channel, said first and second stage coders in combination acting to correlate any data bit of each channel with the second preceding bit of said channel;

(c) a differentiator connected in each channel;

(d) means combining the differentiated signals of said pair of channels and adding to said pair a reference pulse that is out-of-phase with the signals of each channels;

(e) filter means connected to the means of (d) producing a multilevel signal waveform containing the input data information for transmission, said filter means establishing said carrier frequency; and (f) a receiver for receiving the transmitted signal and decoding it into the input binary data.

11. The system of claim 10 further characterized by said first stage coder comprising a pair of AND circuits with the input applied directly to a first and inverted to a second, an OR circuit receiving the output of the two AND circuits, a shift register having a plurality of stages and receiving the output of said OR circuit, a return circuit applying the register output directly to the second AND circuit and inverted to the first AND circuit, and connections applying clock pulses to each of said AND circuits with said clock pulses repeating at the bit rate of said input binary data.

12. The system of claim 11 further characterized by said second stage encoder comprising a plurality of AND circuits connected one to each stage of said shift register, a plurality of flip-flop circuits each connected individually to the output of each and circuit in said second stage encoder, and connections applying gating pulses to the inputs of each and circuit in said second stage encoder, said gating pulses being separated by a predetermined fraction of the bit duration of input data and having a repetition rate equal to the input bit rate.

13. The system of claim 12 further comprising a product modulator receiving the output of said filter means and a local oscillator for heterodyning the signal prior to transmission, and a bandpass filter shaping the signals prior to decoding.

References Cited

UNITED STATES PATENTS

| | | | |
|---|---|---|---|
| 3,311,942 | 3/1967 | DeJager et al. | 325—60 |
| 3,337,863 | 8/1967 | Lender | 325—38 |
| 3,369,229 | 2/1968 | Dorros | 178—68 |
| 3,392,238 | 7/1968 | Lender | 325—30 |
| 3,435,147 | 3/1969 | Malm | 179—15 |

KATHLEEN H. CLAFFY, Primary Examiner

A. B. KIMBAU, Jr., Assistant Examiner

U.S. Cl. X.R.

178—68

UNITED STATES PATENT OFFICE
CERTIFICATE OF CORRECTION

Patent No. 3,515,991 Dated June 2, 1970

Inventor(s) ADAM LENDER

It is certified that error appears in the above-identified patent and that said Letters Patent are hereby corrected as shown below:

Column 12, line 34, "conducting" should read -- containing --; line 50, "said that" should read -- that said -- and "lever-coded" should read -- level-coded--; lines 59-60, "by addition" should read -- by the addition --. Column 13, line 22, "channels" should read -- channel --. Column 14, line 10, "each and" should read -- each AND --; line 12, "and" should read -- AND --.

SIGNED AND SEALED DEC 1-1970

(SEAL)
Attest:

Edward M. Fletcher, Jr.
Attesting Officer

WILLIAM E. SCHUYLER, JR.
Commissioner of Patents